United States Patent [19]

Lattime

[11] 4,230,810
[45] Oct. 28, 1980

[54] METHOD OF PREPARING RESIN

[75] Inventor: Richard R. Lattime, Tallmadge, Ohio

[73] Assignee: The Goodyear Tire & Rubber Company, Akron, Ohio

[21] Appl. No.: 36,957

[22] Filed: May 7, 1979

[51] Int. Cl.$^3$ .......................... C08F 2/00; C08F 20/04; C08F 220/06; C08F 2/16
[52] U.S. Cl. ............................. 526/224; 260/29.6 TA; 260/33.2 R; 526/240; 526/287; 526/317; 526/318; 526/910; 526/923
[58] Field of Search ................ 526/224, 923, 317, 287, 526/318, 240; 260/29.6 TA

[56] References Cited

U.S. PATENT DOCUMENTS

| | | | |
|---|---|---|---|
| 4,064,092 | 12/1977 | Burroway et al. | 260/29.6 TA |
| 4,097,440 | 6/1978 | Maximovich et al. | 260/29.6 TA |
| 4,124,555 | 11/1978 | Gross et al. | 260/29.6 TA |
| 4,153,592 | 5/1979 | Burroway et al. | 260/29.6 TA |

*Primary Examiner*—Joseph L. Schofer
*Assistant Examiner*—Herbert J. Lilling
*Attorney, Agent, or Firm*—H. C. Young, Jr.

[57] ABSTRACT

A method of preparing a resin by free radical emulsion polymerizing a monomer mixture comprised of (A) a water soluble bifunctional monomer, (B) a hard segment hydrophobic enhancing monomer, (C) optionally, a soft segment hydrophobic enhancing monomer, and (D) a hydrophilic enhancing organic acid. The particular advantage in the invention is the utilization of the water soluble bifunctional monomer which has the purpose of essentially eliminating the necessity of additional emulsifying agents. The resin prepared thereby is designed to be suitable for a water reducible composition.

7 Claims, No Drawings

METHOD OF PREPARING RESIN

TECHNICAL FIELD

This invention relates to a method of preparing a particulate resin, water reducible resin composition and a coating prepared therefrom. The invention particularly relates to a method of preparing a particulate resin suitable for a water reducible composition by polymerizing a balanced mixture of a major portion of hydrophobic enhancing monomers, a minor portion of hydrophilic enhancing monomers and minimal amount of polymerizable surfactant.

BACKGROUND ART

Water reducible, or water dilutable, resin compositions can be prepared by the aqueous emulsion polymerization of a manipulated and balanced mixture containing a major portion of hydrophobic enhancing monomers and a minor portion of hydrophilic enhancing monomers. A singular primary advantage of such resins is their departure from a primary dependence upon organic solvents for producing coatings therefrom, thereby enabling coating preparations for various substrates with a much reduced heretofore inherent potential toxicity, flammability and environmental pollution.

It should be appreciated that such aqueous emulsion polymerizations could conveniently be conducted with the aid of typical emulsifiers to suspend or emulsify the monomers and polymers resulting therefrom, following which the polymers could simply be coagulated by the addition of a coagulant such as aluminum sulfate. An inherent disadvantage in such a polymerization and emulsion system for a water reducible resin is that a water-deposit coating thereof on the resin carries with it the water-sensitive emulsifier products. Thus, when the coalesced coating is dried, thereby becoming essentially water-insoluble, the hydrophilic emulsifier products remain to attract water to the coating and promote its degradation.

Therefore, it is an object of this invention to provide a resin formed by aqueous emulsion polymerization which can conveniently be dispersed or dissolved in an aqueous medium to form a suitable coating composition and a coating resulting therefrom without the disadvantage of containing hydrophilic surfactant residue.

A particular advantage of water dilutable (reducible) resins made with a minimal amount of a polymerizable surfactant is that such a resin can be isolated from its latex by spray drying. In such a process, the resin is recovered in powder form directly from its latex without the typical necessity of coagulating filtering and grinding before packaging. Conventional emulsion-promoting surfactants used in conventional resin preparation by latex technique generally leave water soluble residue on the spray dried resin with very poor water resistance.

DISCLOSURE AND PRACTICE OF INVENTION

In accordance with this invention, a method of preparing a resin suitable for a water reducible (dilutable) composition and having a Ring and Ball softening point in the range of about 100° C. to about 300° C., comprises free radical polymerizing, in an aqueous medium having a pH in the range of about 2 to about 7 and in the presence of a free radical initiator and organic mercaptan chain transfer agent, a monomer mixture, based on 100 weight percent of monomers, in a dispersion by mixing with or in water (A) about 0.25 to about 2, preferably about 0.5 to about 1, weight percent of at least one water soluble bifunctional monomer in acid form or neutralized salt thereof, said monomer composed of (i) a first, hydrophilic functional component selected from at least one reactive acid radical or neutralized metal salt thereof selected from at least one of sulfate, sulfonate, carboxylate or phosphate radicals where said metal salts thereof are selected from at least one of sodium, potassium, ammonium or organic amine salts and (ii) a second hydrophobic functional component comprised of at least one of (a) alkenyl aromatic radicals containing 8 to 12, preferably 8 or 9, carbon atoms or (b) a branched or straight chain α-olefine radical containing an average of 2 to 16, preferably 8 to 14, carbon atoms containing one or more, preferably one, carbon-to-carbon double bond unsaturation therein, (B) about 60 to about 95, preferably about 68 to about 85, weight percent of at least one hard segment hydrophobic enhancing monomer selected from styrene, α-methyl styrene, acrylonitrile, methacrylonitrile, vinyl toluene, methyl methacrylate, vinyl chloride and vinylidene chloride, (C) about 0 to about 35, preferably about 13 to about 30 weight percent of at least one soft segment hydrophobic enhancing monomer selected from at least one acrylate selected from methyl acrylate, ethyl acrylate, butyl acrylate, 2-ethylhexyl acrylate, lauryl acrylate, or at least one vinyl ether selected from methyl, ethyl, butyl, octyl, decyl, dodecyl and cetyl vinyl ether and/or at least one diene selected from 1,3-butadiene, isoprene and 2,3-dimethyl butadiene, provided that said dienes of monomer part (C) and said monomer part (B) vinyl chloride and vinylidene chloride are not mixed together and copolymerized, and (D) about 0.25 to 5.0, preferably about 0.5 to about 1.0, weight percent of at least one hydrophilic enhancing organic acid selected from acrylic, methacrylic, fumaric, itaconic and maleic acid.

Various hydrophobic functional components can be used for the bifunctional monomer of this invention such as (a) alkenyl aromatic radicals selected from styrene, α-methylstyrene and vinyl toluene, (b) α-olefins such as ethylene, propylene, butene, pentene, hexene, heptene, octene, nonene, decene undecene, dodecene, tridecene, tetradecene, pentadecene and hexadecene or (c) n-alkylol amides of alpha-beta-olefinically unsaturated carboxylic acids having 4–10 carbon atoms such as 2-acrylamido-methylpropane.

In the further practice of this invention the preferable hard segment hydrophilic enhancing monomer is selected from at least one of styrene, α-methyl styrene, acrylonitrile, methacrylonitrile and vinyl toluene.

Preferred soft segment hydrophobic enhancing monomers for this invention are selected from at least one of methyl acrylate, ethyl acrylate, butyl acrylate, 2-ethylhexyl acrylate or a vinyl ether selected from methyl vinyl ether, isobutyl vinyl ether, n-decyl vinyl ether, dodecyl vinyl ether or n-cetyl vinyl ether, and/or at least one diene selected from 1,3-butadiene or isoprene.

The preferred hydrophilic enhancing organic acid for the resin of this invention are at least one of acrylic, methacrylic, or itaconic acid.

In the preparation of the resin of this invention it is required that a major portion of the monomers are required to form a hard segment of a hydrophobic nature and that a substantial minor portion of the monomers form a relatively soft segment which is hydrophobic in nature. Indeed, only a very minor amount of hydrophilic alpha, beta-olefinically unsaturated carboxylic acid is required or allowed in order to provide an amount of carboxylation of the resin to render it water reducible.

In the preparation of the resin it is required that the aqueous medium have a pH in the range of about 2 to about 7. The pH can simply be adjusted with an inorganic base such as sodium hydroxide, potassium hydroxide and ammonium hydroxide. The polymerization itself containing the bifunctional emulsion-promoting monomer can be conducted by conventional means such as with adequate stirring, general reactor and reaction control, usually at a temperature in the range of about 5° C. to about 80° C. Generally, the aqueous polymerization system contains an amount of monomer to yield about 20 to 50 weight percent solids based on the resin product and water. Conventionally, the free radical initiator can be of the redox chemical derived type or of the heat activated type such as a persulfate. The chain transfer agent is conventionally necessary to control molecular weight.

Although the major thrust and importance of the invention is the utilization of the bifunctional monomers both participate in the polymerization and enhance the suspension or emulsion, it should be understood that minimal amounts of additional and somewhat conventional emulsifiers can be used, although it is generally desired that they are eliminated or not used. If such additional emulsifiers are used in order to maintain the usefulness of this invention, it is desired and required that they amount to a maximum of about 5 percent by weight of the bifunctional monomer utilized in this invention.

The resin can then be recovered, preferably by spray drying, although conventional methods can also be used, such as coagulation, conventional or extruder dewatering and drying, to yield a hard, particulate resin.

It is of a particular advantage of this invention that a water reducible (or dilutable) resin is prepared which is particularly useful for providing coatings which are essentially emulsifier-free.

In this regard, a suitable water reducible (dilutable) composition can comprise an admixture or solution of 100 parts by weight of the resin with about 50 to about 100 parts of coalescing, preferably water soluble, solvent for the resin and about 5 to about 70 parts by weight of at least one resin-compatible plasticizer.

Various coalescing solvents can be used, representative of which are ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, diethylene glycol monomethyl ether acetate, methyl ethyl ketone, acetone methyl propyl ketone and diacetone alcohol. Representative of various resins compatible plasticizers are those generally characterized by having a melting point of about −40° C. to about 25° C., a boiling point of at least about 95° C. and a solubility parameter of about 8 to about 16.

From the water reducible composition is provided a suitable coating composition by mixing and reacting therewith a sufficient amount of a volatile amine followed by mixing water therewith to form a relatively stable dispersion or solution of said composition having a pH in the range of about 8 to about 14. Various amines can be used, representative of which are primary, secondary and tertiary amines having a melting point in the range of about −40° C. to about 25° C. and a boiling point in the range of about 50° C. to about 150° C.

From the coating composition is then prepared a substantially water insoluble coating on a substrate, said coating having a thickness in the range of about 1 to about 40, preferably about 1 to about 5 mils, by simply applying the coating composition to the substrate surface and drying the applied coating to remove the said water, amine and coalescing solvent. The so-called solubility parameter characteristic of the coalescing solvent can be conveniently found and described in *The Encyclopedia of Polymer Science and Technology*, vol 3, p 854 (1965), John Wiley & Sons, Inc.

The practice of this invention is further illustrated by reference to the following examples which are intended to be representative rather than restrictive of the scope of the invention. Unless otherwise indicated, all parts and percentages are by weight.

EXAMPLE I

Various resins suitable for preparing water reducible compositions were prepared by the following method and identified herein as Experiments A-E.

A reactor was charged with water and heated to 75° C. During heat-up the reactor was alternately evacuated and purged with $N_2$ several times to exclude or remove oxygen from the system. When the internal temperature of the reactor lined out at 75° C. the polymerizable surfactant monomer, a solution of a suitable free radical generating initiator and approximately 10 percent of the hydrophilic/hydrophobic comonomer blend with a mercaptan chain transfer agent was added to the reactor and the mixture agitated. After about 30 minutes the remainder of the monomer mixture was slowly added at a rate to take approximately 4–5 hours. The reactor was maintained at about 75° C. during the polymerization and for 2 additional hours after all of the monomer mixture had been added. The resulting latex was cooled and discharged from the reactor. The latex was then coagulated and dried to recover a particulate resin having a Ring and Ball softening point in a range of about 110° C. to about 170° C. The Ring and Ball softening point is of the type determinable by ASTM Method E28-58T.

In this example, various monomer mixtures were used which are summarized in the following Table 1. The columns A-E represent Experiments A-E with their corresponding amounts of monomers in parts by weight.

TABLE 1

| Monomers | | A | B | C | D | E |
|---|---|---|---|---|---|---|
| A. | Hard segment | | | | | |
| | styrene | 79.5 | 70.0 | 79.5 | 77.0 | 79.0 |
| | α-methyl styrene | | | | | |
| | acrylonitrile | | | | | |
| | vinyl toluene | | | | | |
| | methyl methacrylate | | | | | |
| B. | Soft segment | | | | | |
| | 2-ethylhexyl acrylate | 20.0 | | | | |
| | butyl acrylate | — | 25.0 | 20.0 | 20.0 | 20.0 |
| C. | Hydrophilic enhacing monomer | | | | | |
| | acrylic acid | | | | | |
| | methacrylic acid | 0.5 | 5.0 | 0.5 | 3.0 | 1.0 |
| D. | Monomer/surfactant | | | | | |
| | (1) A sodium salt of a short chain vinyl sulfonate | 1.0 | — | — | 1.0 | 1.0 |
| | (2) An ammonium salt of an | | | | | |

TABLE 1-continued

| Monomers | A | B | C | D | E |
|---|---|---|---|---|---|
| acrylic sulfate | — | 1.0 | — | — | — |
| (3) A sodium salt of 2-acrylamide-2-methyl-propane sulfonic acid | — | — | 2.0 | — | — |

EXAMPLE II

In order to evaluate water sensitivity of the resin films, the various compositions in Example I were simply mixed with butoxy ethyl alcohol at solids concentration of 33⅓ percent. The results are shown in Table 2.

TABLE 2

| Resin (from Table 1) | A | B | C | D | E |
|---|---|---|---|---|---|
| Viscosity, cps 33⅓% in butoxy ethyl alcohol | 825 | 390 | 450 | 350 | 480 |
| *Water Sensitivity | OK | OK | poor | OK | OK |

Films, 1–2 mils dry, were cast on glass plate and air-dried 4 days, then oven dried for 2 hrs at 220° F. The films were water spotted and a watch glass was taped over the water spot to prevent evaporation. The films were visually, comparatively rated after 24 hours.

EXAMPLE III

Several film forming, water reducible coating compositions were prepared by mixing several of the various resins A-E produced according to Example I with water, dimethyl ethyl amine, coalescing solvents and mixtures of plasticizers in the amounts as indicated by Table III. They are represented as Experiments F-J. Films of these coatings were prepared and checked for water sensitivity in the manner of Example II. These results are shown in Table III:

TABLE 3

| Components | F | G | H | I | J |
|---|---|---|---|---|---|
| Resin | | | | | |
| A | 100 | | | | |
| B | | 100 | | | |
| C | | | 100 | | |
| D | | | | 100 | |
| E | | | | | 100 |
| Water | 186.5 | di | di | di | di |
| Dimethyl ethylamine | 10.0 | 5 | di | di | di |
| Chlorinated Paraffin | 33.3 | di | di | di | di |
| Hydrogenated Terphenyl | 33.3 | di | di | di | di |
| ethyleneglycol monobutylether | 41.6 | di | di | di | di |
| Water sensitivity | OK | OK | Poor | OK | OK |
| Solution Stability | OK | OK | OK | OK | OK |

Although the film formed in Experiment H in Example III as well as the resin film C in Example II formed from the resin C of Example I was given an evaluation of poor under the water sensitivity test, it should be pointed out that had a conventional emulsifier been utilized to make the initial resin itself, instead of the inventor's bifunctional monomer/surfactant, it is anticipated that a film formed therefrom by simply drying on a glass plate would have readily failed the water sensitivity test and the film would have simply been expected to have been actually lifted or delaminated from the glass upon being water spotted.

While certain representative embodiments and details have been shown for the purpose of illustrating the invention, it will be apparent to those skilled in this art that various changes and modifications may be made therein without departing from the spirit or scope of the invention. 9n

I claim:
1. A method of preparing a resin composition and having a softening point in the range of about 100° C. to about 300° C., which comprises free radical polymerizing, in an aqueous medium having a pH in the range of about 2 to about 7 and in the presence of a free radical initiator and organic mercaptan chain transfer agent, a monomer mixture, based on 100 weight percent of monomers, in a dispersion by mixing with or in water (A) about 0.25 to about 2 weight percent of at least one water soluble, polymerizable surfactant in the form of a bifunctional monomer in acid form or neutralized salt thereof, said monomer composed of (i) a first, hydrophilic functional component selected from at least one reactive acid radical or neutralized metal salt thereof selected from at least one of sulfate, sulfonate, carboxylate or phosphate radicals where said metal salts thereof are selected from at least one of sodium, potassium, ammonium or organic amine salts and (ii) a second hydrophobic functional component comprised of at least one of (a) alkenyl aromatic radical selected from at least one of styrene, α-methylstyrene and vinyl toluene or (b) selected from at least one of ethylene, propylene, butene, pentene, hexene, heptene, octene, nonene, decene, undecene, dodecene, tridecene, tetradecene, pentadecene and hexadecene of (c) an n-alkylol amide of an alpha-beta-olefinically unsaturated carboxylic acid having 4–10 carbon atoms, (B) about 60 to about 95 weight percent of at least one hard segment hydrophobic enhancing monomer selected from styrene, α-methylstyrene, acrylonitrile, methacrylonitrile, vinyl toluene, methyl methacrylate, vinyl chloride and vinylidene chloride, (C) about 0 to about 35 weight percent of at least one soft segment hydrophobic enhancing monomer selected from at least one acrylate selected from methyl acrylate, ethyl acrylate, butyl acrylate, 2-ethylhexyl acrylate, lauryl acrylate, or at least one vinyl ether selected from methyl, ethyl, butyl, octyl, decyl, dodecyl and cetyl vinyl ether and/or at least one diene selected from 1,3-butadiene, isoprene and 2,3-dimethyl butadiene, provided that said dienes of monomer part (C) and said monomer part (B) vinyl chloride and vinylidene chloride are not mixed together and copolymerized, and (D) about 0.25 to 5.0 weight percent of at least one hydrophilic enhancing organic acid selected from acrylic, methacrylic, fumaric, itaconic and maleic acid; and where in said aqueous polymerization medium, if additional emulsifier(s) is used, it is used in an amount up to a maximum of about 5 weight percent of said bifunctional monomer surfactant used.

2. The method of claim 1 wherein said monomer mixture is comprised of (A) about 0.5 to about 1 weight percent of said water soluble bifunctional monomer, (B) about 68 to 85 weight percent of said hard segment hydrophobic enchancing monomer, (C) about 13 to about 30 weight percent of said soft segment hydrophobic enchancing monomer and (D) about 0.5 to about 1 weight percent of said hydrophilic enhancing organic acid.

3. The method of claim 2 where the hard segment hydrophilic enhancing monomer is selected from at least one of styrene, α-methyl styrene, acrylonitrile, methacrylonitrile and vinyl toluene.

4. The method of claim 3 where said soft segment hydrophobic enhancing monomer is selected from at least one of methyl acrylate, ethyl acrylate, butyl acrylate, 2-ethylhexyl acrylate or a vinyl ether selected from methyl vinyl ether, isobutyl vinyl ether, n-decyl vinyl ether, dodecyl vinyl ether or n-cetyl vinyl ether, and/or at least one diene selected from 1,3-butadiene or isoprene.

5. The method of claim 4 where said hydrophilic enhancing organic acid is selected from at least one of acrylic, methacrylic and itaconic acid.

6. The method of claim 1 wherein the polymerization is conducted at a temperature in the range of about 5° C. to about 80° C. and the aqueous polymerization system contains an amount of monomer to yield about 20 to about 50 weight percent solids based on the resin product and water; wherein the hard segment hydrophilic enhancing monomer is selected from at least one of styrene, α-methyl styrene, acrylonitrile, methacrylonitrile and vinyl toluene; wherein said soft segment hydrophobic enhancing monomer is selected from at least one of methyl acrylate, ethyl acrylate, butyl acrylate, 2-ethylhexyl acrylate or a vinyl ether selected from methyl vinyl ether, isobutyl vinyl ether, n-decyl vinyl ether, dodecyl vinyl ether or n-cetyl vinyl ether, and/or at least one diene selected from 1,3-butadiene or isoprene; and wherein said hydrophilic enhancing organic acid is selected from at least one of acrylic, methacrylic and itaconic acid.

7. The method of claim 6 wherein the polymerizable surfactant in the form of a bifunctional monomer is selected from (a) a sodium salt of a short chain vinyl sulfonate, (b) an ammonium salt of an acrylic sulfonate or (c) a sodium salt of 2-acrylamide-2-methylpropane sulfonic acid.

* * * * *